Dec. 16, 1958 A. SHULMAN 2,864,969

OFF-SCREEN BLANKING CIRCUIT

Filed Feb. 26, 1957 2 Sheets-Sheet 1

INVENTOR,
ABRAHAM SHULMAN

BY

Harry M. Saragovitz
ATTORNEY

Dec. 16, 1958 A. SHULMAN 2,864,969

OFF-SCREEN BLANKING CIRCUIT

Filed Feb. 26, 1957 2 Sheets-Sheet 2

INVENTOR,
ABRAHAM SHULMAN

BY Harry M. Saragovitz
ATTORNEY

United States Patent Office 2,864,969

Patented Dec. 16, 1958

2,864,969

OFF-SCREEN BLANKING CIRCUIT

Abraham Shulman, Jamaica, N. Y., assignor to the United States of America as represented by the Secretary of the Army Application February 26, 1957, Serial No. 642,630

3 Claims. (Cl. 315—20)

This invention relates to improvement in contrast of cathode ray tube displays by blanking out any cathode ray beam display tending to extend outside the cathode ray tube face.

In television and radar displays, particularly radar P. P. I. when operated with the center of the display offset from the center of rotation, the portion of the beam which does not directly reach the face of the tube is not entirely lost in the coating on the side walls of the tube but is partially diffused over the face of the tube. This causes a general glow over the tube face, which tends to reduce the contrast and obscure the intended display of useful information.

An article by the present inventor in "Electronics," May 1956 describes a P. P. I. system in which the presentation on the face of the cathode ray tube may at times extend beyond the edges of the face of the tube. The necessary deflection coordinates to accomplish such a sweep are provided thru driver amplifiers controlled in accordance with the position of the antenna of the P. P. I. system. In such a P. P. I. system it is common to provide the desired sweep waveform as a voltage wave and then use a differential feedback circuit to force the actual deflection coil current to follow this voltage waveform. Since the deflection coil currents are normally in the anode circuit of the driver amplifier, it is often inconvenient to measure the deflection coil current directly. However, for convenience in the connection to the feedback circuit, the deflection coil current may be readily measured in the cathode circuit of the driver amplifier; in the case of screen grid tubes a correction for the screen grid current, which also flows in the cathode circuit but not the anode coil, may be obtained from the screen grid circuit, if desired. This same measurement of the deflection coil current may be used in determining the extent of deflection of the cathode ray tube beam for the purpose of providing off-screen blanking in accordance with the present invention.

An object of this invention is to provide a simple circuit to suppress the beam of the cathode ray tube whenever the deflection coils are energized in such a way as to throw the beam off the face of the tube.

Other objects of the invention will be apparent from the following description and accompanying drawings, in which—

Figures 1, 3:
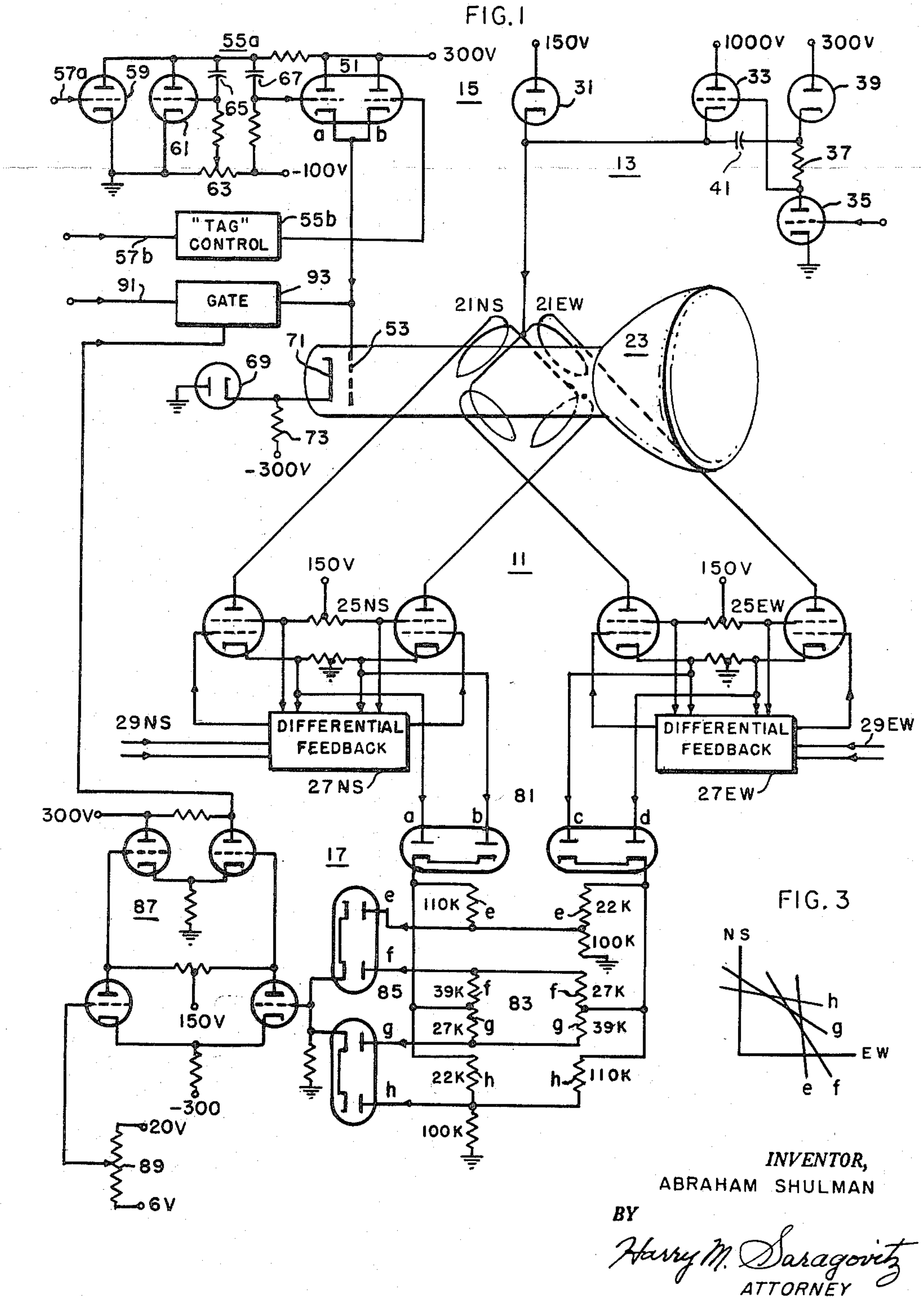

Fig. 1 shows a cathode ray tube with a deflecting system including a suitable circuit for suppressing the cathode ray tube beam during periods of excessive deflection.

Figure 2:
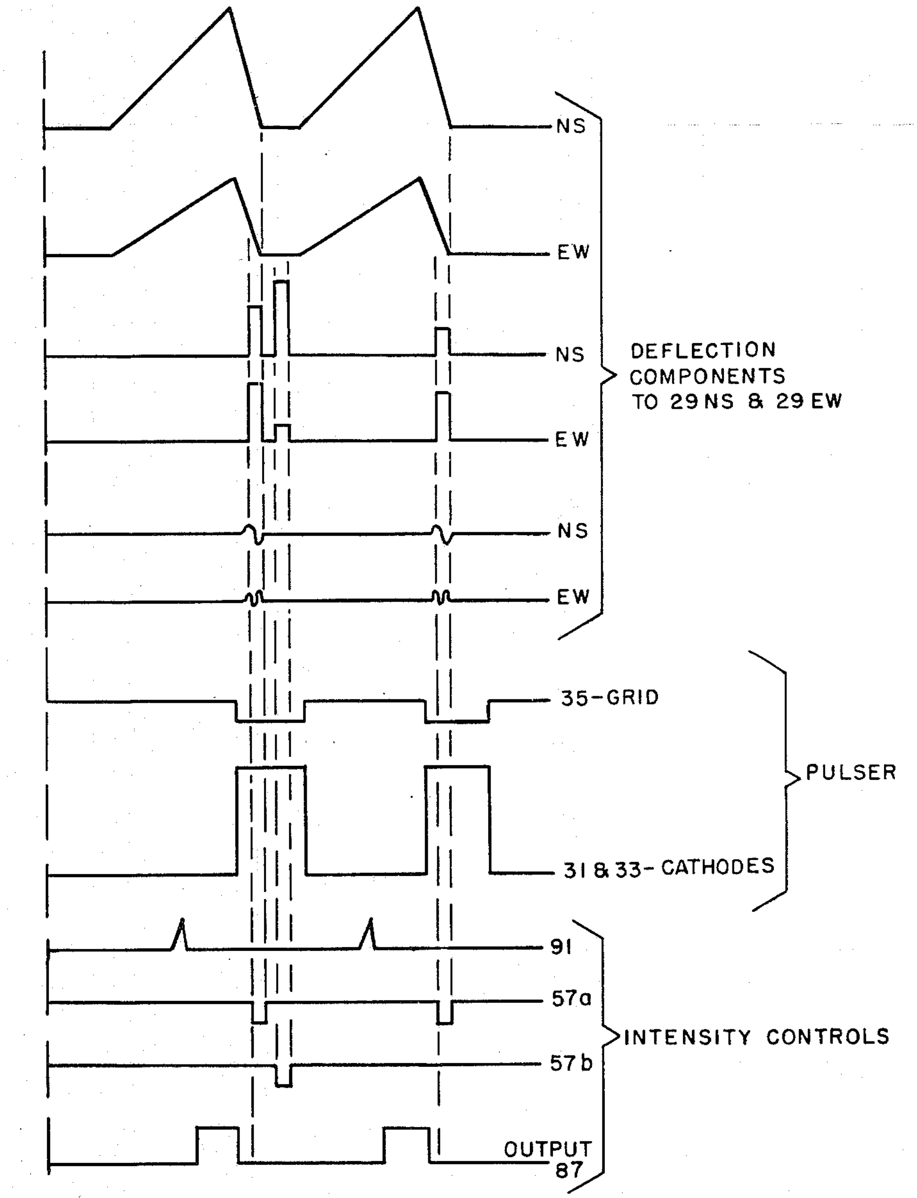

Fig. 2 includes a series of typical waveforms involved in the operation of Fig. 1.

Fig. 3 illustrates the geometric relations involved in the deflection system as applied to the suppression of the cathode ray tube beam during periods of excessive deflection as accomplished by the present invention.

Fig. 1 includes the basic display system 11 including the cathode ray tube and deflection amplifiers connected in the customary manner and the off-screen blanking system 17 forming the subject matter directly involved in the present invention. Fig. 1 also includes a further beam intensity circuit 15, to assure display of certain extra information and the usual P. P. I. data with proper relative intensity, and the anode pulser 13, to provide increased anode voltages for the driver amplifiers during any period when rate of change of deflection coil current is so high that increased anode voltage is needed to overcome the deflection coil inductance. These circuits are the subject matter of applications by the present inventor for Area Balanced Pulse Amplifier and Anode Pulser, Serial Nos. 642,629 and 642,631, respectively, filed concurrently herewith.

As shown in Fig. 1 the deflection coil 21NS on cathode ray tube 23 is controlled by the push-pull driver 25NS. The cathode and screen-grid currents in this driver are supplied to a differential feedback system 27NS which has as one function to subtract the screen-grid currents from the cathode currents and thereby determine the actual plate current which passes thru the deflection coil. The voltage input 29NS, intended to establish the actual waveform of the deflection current, is also supplied to the differential feedback system which has a second function to regulate the control grids of the drivers 25NS by the input waveform and the actual current in the deflection coil as determined by the subtraction so that the current waveform in the deflection coil actually corresponds to the voltage waveform supplied at the input 29NS to the differential feedback system. A similar deflection coil 21EW and corresponding circuits provides for the deflection at right angles to that provided by coil 21NS. The deflection voltage input to differential feedback systems 27NS, and 27EW, includes components corresponding to the normal P. P. I. sweep and any offset voltage therefor, and also the computed coordinates, tag generating voltage, etc. from each computer in use.

In the off-screen blanking circuit 17, voltages substantially proportional to the deflecting coil currents are obtained from the driver amplifier cathode circuits and applied thru diodes 81*a*, *b*, *c* and *d* to a resistor network 83. In the actual circuit the diodes 81*a–d* and 85*e–h* would normally be contact rectifiers to operate at low voltage.

The voltages from the driver 25NS appear on one terminal of the resistor network and the voltages from the other driver 25EW on the other terminal of the resistor network so that either N or S components of the deflection provide the same positive polarity at the first terminal and either E or W components of deflection also provide the same positive polarity at the other terminal of the resistor network. The resistor network includes four groups of resistors *e*, *f*, *g*, and *h*, each of which provides a combined voltage dependent on the sum of certain portions of these voltages corresponding to the NS and EW deflections. For example, in the portion *e* of network 83, the combined voltage is dependent almost entirely on the voltage in the EW channel and only slightly affected by the voltage in the NS channel. The other portions *f*, *g* and *h* of the network 83 provide voltages dependent on the sum of other portions of these voltages. The output of these network portions are connected thru diodes 85*e*, *f*, *g* and *h* which permit only the highest output voltage to reach the control amplifier 87. This control amplifier is adjustable by means of the potentiometer 89 to provide an output corresponding to any chosen value of the total deflection as determined from the resistor network 83 and diodes 85. The output of the control amplifier 87 is connected to the gate 93 thru which the P. P. I. video input 91 is normally applied to the grid 53 of the cathode ray tube to suppress the beam whenever the deflection extends off the screen.

The effect of combining the several voltages from the resistor network 83 is illustrated in Fig. 3 showing the various straight line portions *e, f, g* and *h* corresponding to the values of NS and EW deflection sufficient to produce an output voltage thru the corresponding diodes 85*e, f, g* and *h* sufficient to cause operation of the amplifier 87 and the resulting suppression of the cathode ray tube beam. In each case the effective portions of these lines, thru a certain range of the vector angles, corresponds approximately to the outline of the cathode ray tube face and the lines collectively correspond to any vector angle. From the geometrical standpoint, if these portions were entirely inside they would be considered as chords, and if outside they would be considered as tangents. Since a very close approximation to the shape of the cathode ray tube face is obtained from only the four resistor networks there would be little difference whether considered as chords, tangents, or merely approximations to the cathode ray tube face shape.

Due to the operation of diodes 85*e–h* the control amplifier 87 responds to the highest potential of the networks 83*e–h*. The network 83*e* would apply such a potential to the amplifier thru diode 85*e* when the EW component is alone sufficient, or so nearly sufficient that the NS component can raise the network voltage slightly. This is represented by the line *e* in Fig. 3 corresponding to deflection component amplitudes necessary to operate the control amplifier thru diode *e*. When the NS component amplitude approaches that of the EW component, the network 83*f* provides a higher output than 83*e* and therefore could operate control amplifier 87 with lower component amplitudes than 83*e*. This is illustrated by the line *f* of Fig. 3. Similarly lines *g* and *h* represent the component amplitudes needed to operate the control amplifiers thru networks 83*g* and *h* and diodes 85*g* and *h*, operated most readily by slightly greater NS component than EW component and by predominatly NS components respectively.

Altho the anode pulser may have some effect on the coil currents this would occur during the return trace of the P. P. I. display and therefore any blanking by the off-screen circuit during this period would be of no significance.

The diode 69 having its anode grounded and its cathode connected to the cathode ray tube cathode 71 maintains the latter just below ground potential except when the cathode ray tube beam current increases beyond the point where the voltage drop in resistor 73 exceeds the voltage applied, shown as —300 volts. At this point the sudden voltage rise on the cathode limits the beam current rather sharply to prevent excessive brilliance and burning of the cathode ray tube screen.

The tag intensity control circuit 15 and anode pulser 13 are more fully described in the other applications identified above but will also be briefly described herein.

In connection with P. P. I. displays, it is frequently desirable to include computed information corresponding to the predicted positions of various objects. To distinguish the computed information from the normal radar echoes, it may also be desirable to generate some simple additional scan such as a small circle, ellipse, etc. and to provide suitable spot brilliance during part or all of this additional scan, or even somewhat longer, thus producing a dashed or partial circle, full circle, circle with tail, etc. commonly referred to as "tags." The current change required for this scan is of small amplitude but rater high frequency and therefore involves a rapid motion of the cathode ray tube beam which requires increased beam current to maintain a reasonable brilliance and also may require increased anode voltage in the deflection driver amplifiers to accomplish the increased speed of scan. The tags may be applied at irregular intervals and yet must be maintained at fairly uniform brilliance to be visible and yet avoid obscuring the ordinary radar echoes. To provide suitable intensity for the various tags a plurality of cathode follower mixers 51*a* and *b* are connected in the circuit of the cathode ray tube control grid 53, and the grids are connected to control circuits 55*a* and *b*, one of which is shown disgrammatically. When a particular tag is to be applied the corresponding input 57*a* or *b* is energized by a negative signal which is applied to the grid of normally energized triode 59 to cut it off. The normally deenergized triode 61, biased to a voltage determined by the setting of potentiometer 63, starts to conduct as soon as capacitor 65 raises the grid above the cutoff potential of the triode; this prevents further anode voltage rise. A similar capacitor 67 coupled to the grid of one cathode follower tube 51*a* applies the proper voltage to the cathode ray tube grid. The similarity of the two capacitor coupled circuits provides for an area-balancing of the pulse waveform and maintains uniform cathode ray tube grid voltage during the proper interval for each tag even if duty cycles vary widely.

During any time of rapid deflection of the cathode ray tube beam increased anode voltage on the deflection driver amplifiers is necessary to overcome the inductance of the deflection coils. This is accomplished by the anode pulser 13 in which a diode 31 connected to a low anode potential, shown as 150 volts, supplies the normal operating anode voltage for the drivers. A triode 33 connected to a high anode source of supply, shown as 1000 volts, can be operated during times of high deflection velocity to apply the high anode voltage to the deflection driver amplifiers. While this high voltage is being applied the diode 31 becomes nonconductive. A control circuit comprising a triode 35, resistor 37, and diode 39 in series with the anode of the diode, connected to a moderate anode voltage, shown as 300 volts, normally applies a low voltage to the grid of triode 33 and therefore prevents its operation. However, when a negative pulse is applied to the grid of the triode 35 the voltage of its anode and that of the grid of triode 33 rises rapidly causing conduction in the triode 33. A coupling condenser 41 from the cathode of triode 33 to the cathode of diode 39 maintains the positive grid potential on the triode 33 by a bootstrap action and stops conduction in the diode 39 until termination of the negative pulse applied to the triode 35.

In Fig. 2 several typical waveforms are shown to illustrate the operation of the system of Fig. 1. The various waveforms are identified according to the corresponding locations on Fig. 1. It is noted that the three inputs shown for each of the differential feedback systems are combined before actual use, but the combined waveform is not shown; the normal P. P. I. sweep voltages are gated off to permit inserting the square pulses corresponding to the computer outputs, and the circle drawing sine-cosine wave segments are merely added during such square pulses. The anode pulser input wave controls this circuit as indicated above to provide the required high voltage for the driver amplifier during the time of slewing. The pulse echo input on lead 91, tag intensification, and off screen blanking are all related to the cathode ray tube control grid operation; as shown the echoes occur along the effective part of the normal sweep, the intensification occurs during the proper time for tag presentation, and the blanking occurs while the P. P. I sweep is of too great amplitude and would extend beyond the cathode ray tube face. As indicated in the diagram the latter blanking control might operate when either P. P. I. sweep or computed data extends beyond the cathode ray tube face. However, for even greater time economy, it is also possible to operate such a circuit from only the normal P. P. I. sweep. The output of such a circuit would then eliminate normal radar echoes and provide further time for display of the extra information otherwise displayed only during the return trace.

A preferred embodiment of the invention has been described to facilitate an understanding of the invention, but many variations will be apparent to those skilled in the art.

What is claimed is:

1. In a deflection system for a cathode ray tube, means for providing deflection along each of two coordinates of the face of said tube, means to obtain voltages proportional to the amplitudes of deflection along each of said coordinates, means to combine said voltages to provide a single output voltage substantially proportional to the absolute value of their vector sum, and means responsive to said output voltage to suppress the beam of said cathode ray tube when said deflection extends beyond the limits of said cathode ray tube face.

2. In a deflection system for a cathode ray tube, means for providing deflection along each of two coordinates of the face of said tube, means to obtain voltages proportional to the amplitudes of deflection along each of said coordinates, first rectifier means to combine the voltages along each of said coordinates to voltages of one polarity corresponding to the absolute values of the amplitude of deflection along each of said coordinates, and an output circuit to suppress the beam of said cathode ray tube when said deflection extends beyond the limits of said cathode ray tube face, connected through a plurality of second rectifier means, responsive to voltages of said one polarity, successive ones of said second rectifier means corresponding to deflection angles relative to one of said coordinates equal to successive odd multiples of the angle $\pi/4$ divided by the number of said second rectifier means, each said second rectifier means being connected through resistors to each of said voltages of one polarity and to a reference point from which said voltages are measured, the resistors from each rectifier means to each voltage of one polarity or reference being of different value proportioned to provide a voltage at each rectifier means proportional to the sum of the sine of the angle corresponding to the rectifier times one of said voltages of one polarity, and the cosine of such angle times the other of said voltages, the voltage in said output circuit corresponding to the maximum of said sums.

3. In a deflection system for a cathode ray tube, means for providing deflection along each of two coordinates of the face of said tube, means to obtain voltages proportional to the amplitudes of deflection along each of said coordinates, means to combine said voltages to provide a single output voltage corresponding to the maximum of several combined voltages, each combined voltage including fractions of said first voltages so proportioned that the combined voltage corresponds substantially to the absolute value of the vector sum of said first voltages thru a certain range of the vector angle, the several combined voltages collectively corresponding to any vector angle, and means responsive to said output voltage to suppress the beam of said cathode ray tube when said deflection extends beyond the limits of said cathode ray tube face.

References Cited in the file of this patent

UNITED STATES PATENTS

| | | |
|---|---|---|
| 2,261,776 | Poch | Nov. 4, 1941 |
| 2,369,631 | Zanarini | Feb. 13, 1945 |